United States Patent [19]

Fournier et al.

[11] 4,381,317

[45] Apr. 26, 1983

[54] METHOD OF MAKING A PIZZA

[76] Inventors: Robert L. Fournier; Priscilla J. Fournier, both of 5607 N. 22nd St., Arlington, Va. 22205

[21] Appl. No.: 297,620

[22] Filed: Aug. 31, 1981

[51] Int. Cl.³ .............................................. A21D 6/00
[52] U.S. Cl. ................................... 426/302; 426/237; 426/466; 426/523
[58] Field of Search ............... 426/523, 302, 237, 466, 426/439

[56] References Cited

U.S. PATENT DOCUMENTS

| | | | |
|---|---|---|---|
| 3,943,910 | 3/1976 | White | 426/523 X |
| 3,993,788 | 11/1976 | Longenecker | 426/523 X |
| 4,122,198 | 10/1978 | Wisdom et al. | 426/466 X |
| 4,164,591 | 8/1979 | Ahlgren et al. | 426/523 |
| 4,285,979 | 8/1981 | Izzi | 426/302 X |

Primary Examiner—Arthur D. Kellogg
Attorney, Agent, or Firm—A. W. Breiner

[57] ABSTRACT

This invention relates to the method of making a pizza in a cooking utensil which includes the steps of adding the ingredients to a pizza skillet; cooking the pizza first on the stove top to cook and brown the crust and, thereafter, placing the pizza in the broiler of the stove to cook the top of the pizza to obtain a finished pizza. A finished pizza is obtained in a relatively short period of time.

4 Claims, No Drawings

METHOD OF MAKING A PIZZA

This invention relates in general to a new and useful improvement in the method of making a pizza. More particularly, the present invention relates to a new and novel method of making a pizza in a pizza skillet by cooking the pizza first on a stove burner and then in the broiler of the stove.

Heretofore pizza has normally been made by preparing the pizza in a pan, e.g. a cookie tin, and placing the pizza in a preheated oven to cook for a certain period of time. This method of cooking a pizza allows for little control over the heating and cooking of the pizza. This is due to the fact that the oven is set at a uniform temperature, e.g. 425° F., and the pizza is cooked from both the top and the bottom at the same time and at the same temperature. This method of cooking often results in either the top or the bottom of the pizza being under cooked or over cooked.

A further disadvantage of oven cooking a pizza is that it is time consuming, in that it requires preheating the oven to at least 425° F. Preheating the oven takes at a minimum 15 minutes and, thereafter, cooking the pizza takes in the range of 16 to 20 minutes. This precludes the cook from preparing a pizza in a short period of time.

A further disadvantage associated with oven cooking a pizza is that the required preheating of the oven causes a waste of energy.

The present method of preparing a pizza resolves the aforementioned disadvantages of oven cooking a pizza. The present method of making a pizza involves first cooking the pizza on the stove top burner and then in the broiler of the stove in a skillet. An advantage of the present method of preparing a pizza in a pizza skillet is that the pizza can be prepared in a relatively short period of time. The minimum time being approximately six minutes.

Another advantage of the present method is that because the pizza skillet is preferably of cast iron construction and has a relatively thick core, it will be seen that a uniform heating of the upper surface thereof may be effected while placing the skillet on the stove burner. Thus, the cooking of the pizza is initiated on the stove top and after a selected controlled cooking of the pizza has occurred, it is placed in the broiler of the stove and the finished cooking of the pizza in the broiler can be accomplished in a relatively short period of time.

A still further advantage of the present method is that the first step of cooking the pizza on the stove top allows the cook a greater degree of control over the cooking process in that the cook can actually visually determine the degree to which the crust and upper portion of the pizza have become cooked and can make any necessary temperature adjustments. Specifically, this allows for a properly cooked crust. Further, it is well known that a cook has a greater amount of control of the heat temperature when using a stove burner to cook as opposed to an oven.

Another advantage of the present method is that it saves energy because it eliminates the preheating of the oven associated with oven cooking a pizza.

Another advantage of the present method is that it can be used with presently available pizza mixes and most homemade recipes for making pizzas.

Having described the method of making a pizza in a pizza skillet in general terms, a specific and preferred method of making a pizza will be set forth. The specific method involves the new and novel method of cooking the pizza first on the stove burner and then placing the pizza in the broiler of the stove to complete cooking. The ingredients for the pizza used in the following description are from the Chef Boyardee Pizza Mix and the instructions of preparing and adding the ingredients are taken generally therefrom.

The ingredients used are contained in the Chef Boyardee Pizza Mix and include flour mix, pizza sauce and cheese. In addition, corn meal and grease are used.

First, place the flour mix in a small bowl. Add ½ cup of very warm water to the mix and stir until all the flour particles are moistened. Stir the mix vigorously twenty-five (25) strokes. Cover the bowl and let the mix stand in a warm place, 85° F.

While the mix is standing. lightly grease the pizza skillet. Shake the slightest bit of corn meal over the lightly greased pizza skillet.

Grease fingers well and spread the dough on the pizza skillet. The dough should be spread to the edge of the skillet. Then pour the pizza sauce over the dough and spread with a spoon. The cheese is sprinkled over the sauce and the pizza is now ready for baking.

A preferred skillet is in the form of a cast iron pizza skillet having a center core surrounded by a peripheral edge portion which curves upwardly and outwardly and tapers in wall thickness, with a specially configurated handle for detachably supporting the same. The handle is provided at one end with a claw which is particularly configurated to engage the skillet's peripheral edge portion in a manner wherein the handle may be readily engaged and disengaged, and at the same time provide a firm interconnection with the skillet when applied. This preferred pizza skillet is the subject of our co-pending application, "Pizza Skillet with Helper Handles," Patent Application Ser. No. 207,637, filed on Nov. 17, 1980.

The pizza skillet is placed on the burner of the stove. The stove can be gas, electric, or electric utilizing a smooth Corning top. The pizza cooking should begin on medium to medium low heat for about two minutes on a gas stove; for about four minutes on an electric stove; and for about eight to twelve minutes on an electric stove with a smooth Corning top.

When the crust is cooked to the desired crispness, then place the skillet into the broiler of the stove in order to cook the top of the pizza. The pizza should remain in the broiler for about four or five minutes in a gas stove and for about eight minutes in an electric stove, upon completion of the baking remove the pizza skillet pizza and the pizza is ready to be served.

It is, therefore, seen that the present method of preparing a pizza provides a novel method of first cooking the pizza on the stove top burner and then cooking the pizza in the broiler of the stove to provide a quicker method of baking a pizza and a method which allows a cook more control over the cooking of the pizza.

A preferred embodiment of the invention having been described by way of example, it will be understood that modifications or changes may be made to the methods and product of the invention without departing from the spirit of the invention or the scope of the appended claims.

It is claimed:

1. A method of making a pizza product comprising preparing the pizza in a pizza skillet and first cooking the pizza in the skillet on a stove top burner until the crust reaches the desired preparedness and then placing the pizza in the skillet under the broiler of an oven in order to cook the top of the pizza without applying direct heat to the bottom of the pizza skillet until the top of the pizza is fully cooked.

2. A method of making a pizza product as claimed in claim 1 wherein the stove is a gas stove and the pizza is first cooked on the stove top burner for about two minutes with medium to medium low heat and then cooked in the stove broiler for about four or five minutes.

3. A method of making a pizza as claimed in claim 1 wherein the stove is an electric stove and the pizza is first cooked on the stove top burner for about four minutes with medium to medium low heat and then cooked in the stove broiler for about eight minutes.

4. A method of making a pizza as claimed in claim 1 wherein the stove is an electric stove with a smooth Corning top and the pizza is first cooked on the stove top burner for about eight to twelve minutes with medium to medium low heat and then cooked in the stove broiler for about eight minutes.

* * * * *